United States Patent
Shugar et al.

(10) Patent No.: US 6,313,394 B1
(45) Date of Patent: Nov. 6, 2001

(54) ELECTRIC VEHICLE PHOTOVOLTAIC CHARGING SYSTEM

(75) Inventors: Daniel S. Shugar, San Bruno; Thomas L. Dinwoodie, Piedmont, both of CA (US)

(73) Assignee: PowerLight Corporation, Berkeley, CA (US)

( * ) Notice: Subject to any disclaimer, the term of this patent is extended or adjusted under 35 U.S.C. 154(b) by 0 days.

(21) Appl. No.: 09/494,068

(22) Filed: Jan. 28, 2000

Related U.S. Application Data

(60) Provisional application No. 60/118,943, filed on Feb. 5, 1999.

(51) Int. Cl.[7] ................ B60K 1/00; H01L 31/042
(52) U.S. Cl. .................. 136/244; 136/249; 136/251; 136/291; 180/2.2; 180/65.3; 180/65.1; 180/65.2; 296/37.7; 323/906
(58) Field of Search ................... 136/244, 249 MS, 136/251, 291; 180/2.2, 65.3, 65.1, 65.2; 296/37.7; 323/906

(56) References Cited

U.S. PATENT DOCUMENTS

| | | |
|---|---|---|
| D. 330,350 | 10/1992 | Maypole et al. . |
| D. 394,637 | 5/1998 | Camiano . |
| 4,181,188 | 1/1980 | Dessert . |
| 4,218,889 | 8/1980 | Buell . |
| 4,332,415 | 6/1982 | Williams . |
| 4,517,403 * | 5/1985 | Morel et al. ............... 136/258 |
| 4,592,436 | 6/1986 | Tomei . |
| 4,650,238 * | 3/1987 | Healey .................... 296/37.7 |
| 4,663,495 * | 5/1987 | Berman et al. ............ 136/248 |
| 4,744,430 * | 5/1988 | McCoy ..................... 180/2.2 |
| 4,772,065 | 9/1988 | Nakata et al. . |
| 4,773,695 | 9/1988 | Jones et al. . |
| 4,792,175 | 12/1988 | Gerber . |
| 5,094,500 | 3/1992 | Maypole et al. . |
| 5,680,907 | 10/1997 | Weihe . |
| 5,724,824 * | 3/1998 | Parsons ..................... 62/171 |
| 5,725,062 * | 3/1998 | Fronek ..................... 180/2.2 |
| 5,772,272 | 6/1998 | Faddis . |

FOREIGN PATENT DOCUMENTS

| | | |
|---|---|---|
| 58-56943 | 4/1983 | (JP) . |
| 63-71420-A * | 3/1988 | (JP) . |
| 63-71420 | 3/1988 | (JP) . |
| WO87/02512 | 4/1987 | (WO) . |

* cited by examiner

*Primary Examiner*—Alan Diamond
(74) *Attorney, Agent, or Firm*—James F. Hann; Haynes Beffel & Wolfeld LLP

(57) ABSTRACT

A PV roof assembly (6) includes a roof (12) mountable to an electric car (4), and a PV assembly (10) at the upper part of the roof. The PV assembly may be mounted to a separate roof surface (34) or the PV assembly may itself constitute all or part of the roof. The PV assembly may include a monolithic PV panel (14) with a plurality of PV cells (20). The roof may define a storage region (32) accessible through a closable access opening (44). The roof may include a circumferential lip (24) which extends around and above the PV assembly to help prevent damage to the PV panel. The roof may include a protective, at least semi-transparent top layer (60), an at least semi-transparent bottom layer (62) and a semi-transparent PV layer (64) secured between and in contact with the top and bottom layers to create a roof which is itself semi-transparent. The ratio of PV cells to the number of battery cells may be chosen to create a self-regulating design. A misting system (55) with roof-mounted misting outlets (53) can be used for enhanced comfort during hot weather. A graphical display may be used to provide the driver with, for example, energy production and battery charge level.

7 Claims, 6 Drawing Sheets

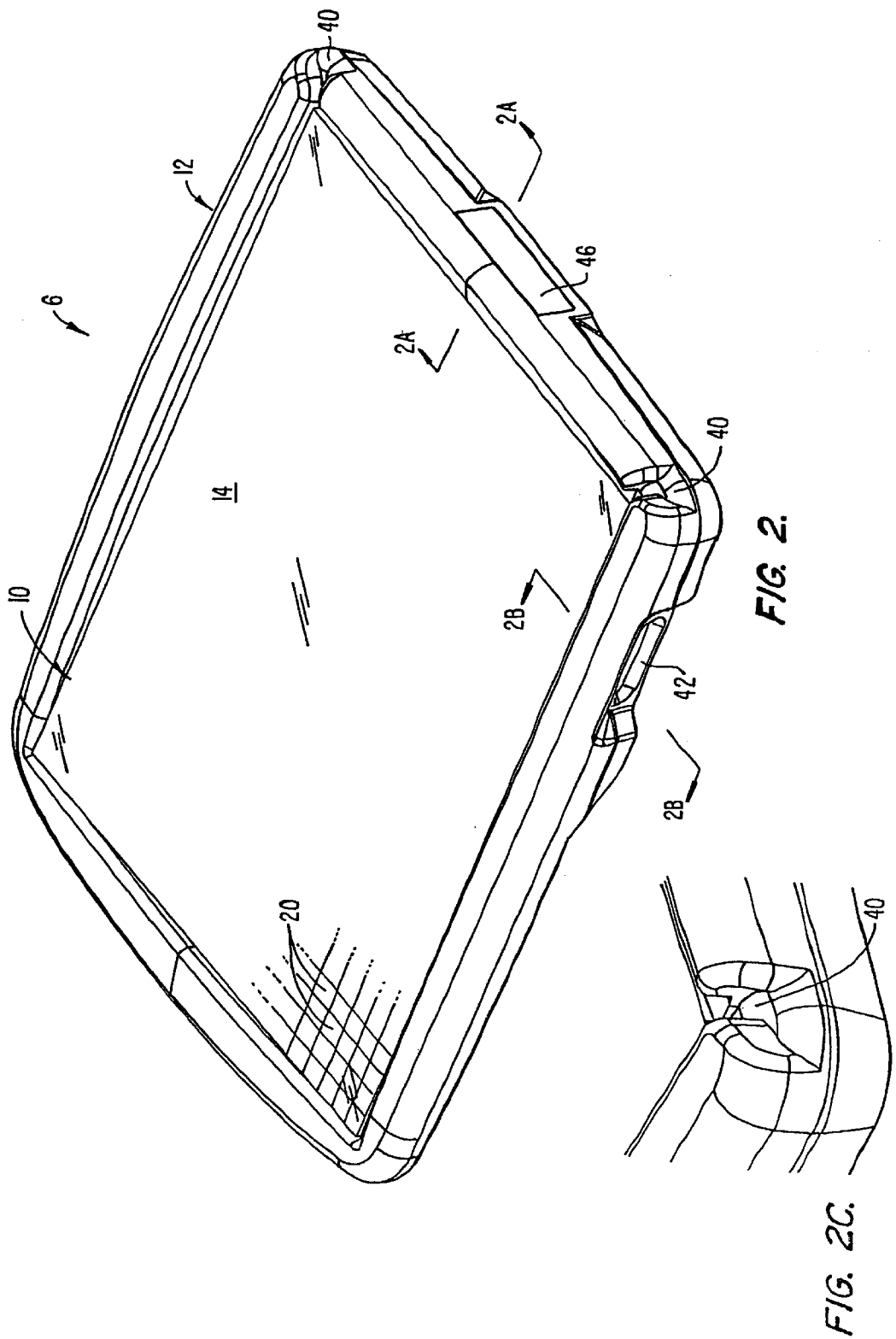

ELECTRIC VEHICLE PHOTOVOLTAIC CHARGING SYSTEM

CROSS-REFERENCE TO RELATED APPLICATIONS

This application claims the benefit of Provisional Patent Application No. 60/118,943, filed Feb. 5, 1999.

BACKGROUND OF THE INVENTION

Smaller electrically powered vehicles, typically called electric cars, are widely used on golf courses and for a variety of electric utility vehicle applications. Although electric golf cars have become widely accepted, they typically require recharging after about to 36 holes of golf. Therefore, a typical 18 hole golf course requires about 80 cars to serve the golfers each day and a building large enough to house all the golf cars at night, during which they are commonly recharged. The recharging process not only takes time, but recharging during daytime hours can significantly increase the cost of electricity as a result of increasing peak demand charges from the utility to the customer.

SUMMARY OF THE INVENTION

The present invention is directed to a photovoltaic (PV) roof assembly which permits the batteries on an electric vehicle, typically referred to as an electric car, to be charged during operation resulting in several benefits. These benefits include extending the range of the electric car because the batteries are charged during operation. The cost of using electricity from the utility to charge the cars is reduced because the batteries are typically at least partially charged by the solar charging during use. The battery life of the car can be extended because the depth of discharge can be reduced during normal use of the car. By increasing the length of time required between charges, labor costs incurred in the process of charging the batteries are reduced. Cars can be used more efficiently, thus possibly reducing the number of cars required by the facility. Finally, there are also benefits to the environment resulting from the reduced use of electricity from the electric utility and the potential need for fewer cars.

A first aspect of the invention is directed to a PV roof assembly which is usable with electric cars. The assembly includes a roof mountable to the electric car, the roof having an upper part. A PV assembly is at the upper part of the roof. The PV assembly may be mounted to a separate roof surface or the PV assembly may itself constitute all or part of the roof. The PV assembly, accordingly to this first aspect, includes a monolithic PV panel with a plurality of PV cells. Providing all the PV cells as part of the monolithic PV panel reduces costs, simplifies construction and assembly and makes a more reliable system.

Another aspect of the invention is a PV roof assembly for use with electric cars. The assembly includes a roof mountable to an electric car and a PV assembly at an upper part of the roof. The roof includes a bottom spaced apart from the upper part and defines a storage region between the bottom and upper part of the roof. The roof includes an access opening, which opens into the storage region, and a movable cover for the access opening. This permits storage of and access to various components by the car owner, operator and/or service technician.

A further aspect of the invention is directed to an electric car PV charging system usable with electric cars. The system includes a roof, mountable to the electric car, including a support surface. A PV assembly is secured to the support surface. The PV assembly includes a PV panel having a circumferential edge while the roof includes a circumferential lip extending around and above the PV assembly. The circumferential lip helps to prevent damage to the PV panel. To provide further protection, an edge protector may be used to cover at least a portion of the circumferential edge of the PV panel. The circumferential lip may include a recess which houses the circumferential edge.

Another aspect of the invention is directed to an electric car PV charging system which includes a roof mountable to an electric car. The roof includes a protective, at least semi-transparent top layer, a bottom layer and a PV layer secured between and in contact with the top and bottom layers. A bottom layer which is at least semi-transparent and a PV layer which is semi-transparent may be used to create a roof which is itself semi-transparent.

According to another aspect of the invention, the assembly includes a roof mountable to the electric car, the roof including an upper part. A PV assembly, at the upper part of the roof, includes a number of PV cells, the ratio of PV cells to the number of battery cells being between (a) about 4.80 to 5.48 PV cells to battery cells, and more preferably about 5.10 to 5.40 PV cells to battery cells, when the PV assembly comprises at least one of crystalline and poly-crystalline photovoltaics, (b) about 4.20 to 5.20 PV cells to battery cells, and more preferably about 4.40 to 5.00 PV cells to battery cells, when the PV assembly comprises hybrid crystalline/thin film photovoltaics, and (c) about 4.10 to 5.50 PV cells to battery cells, and more preferably about 4.20 to 5.40 PV cells to battery cells, when the PV assembly comprises thin-film photovoltaics. This design helps the PV assembly to be self-regulating.

A further aspect of the invention relates to an electric car and PV charging system in which a roof is mountable to the electric car and a PV assembly is at the upper part of the roof. A misting system includes misting outlets, from which mist can be discharged, mounted to the roof. This permits enhanced comfort for the occupants during hot weather.

A still further aspect of the invention relates to an electric car and PV charging system in which a graphical display is mounted either on the roof, or on the electric car, or freestanding, to inform the driver of the energy production, pollution avoidance, battery state of charge, and/or other informative parameters related to the operation of the invention.

Other features and advantages of the invention will appear from the following description in which the preferred embodiments have been set forth in detail in conjunction with the accompanying drawings.

BRIEF DESCRIPTION OF THE DRAWINGS

FIG. 2 is a top, rear, right side isometric view of the PV roof assembly of FIG. 1;

FIG. 2C is an enlarged view illustrating a rain gutter outlet along one of the back corners of the roof of FIG. 2;

DESCRIPTION OF THE SPECIFIC EMBODIMENTS

Figure 1:
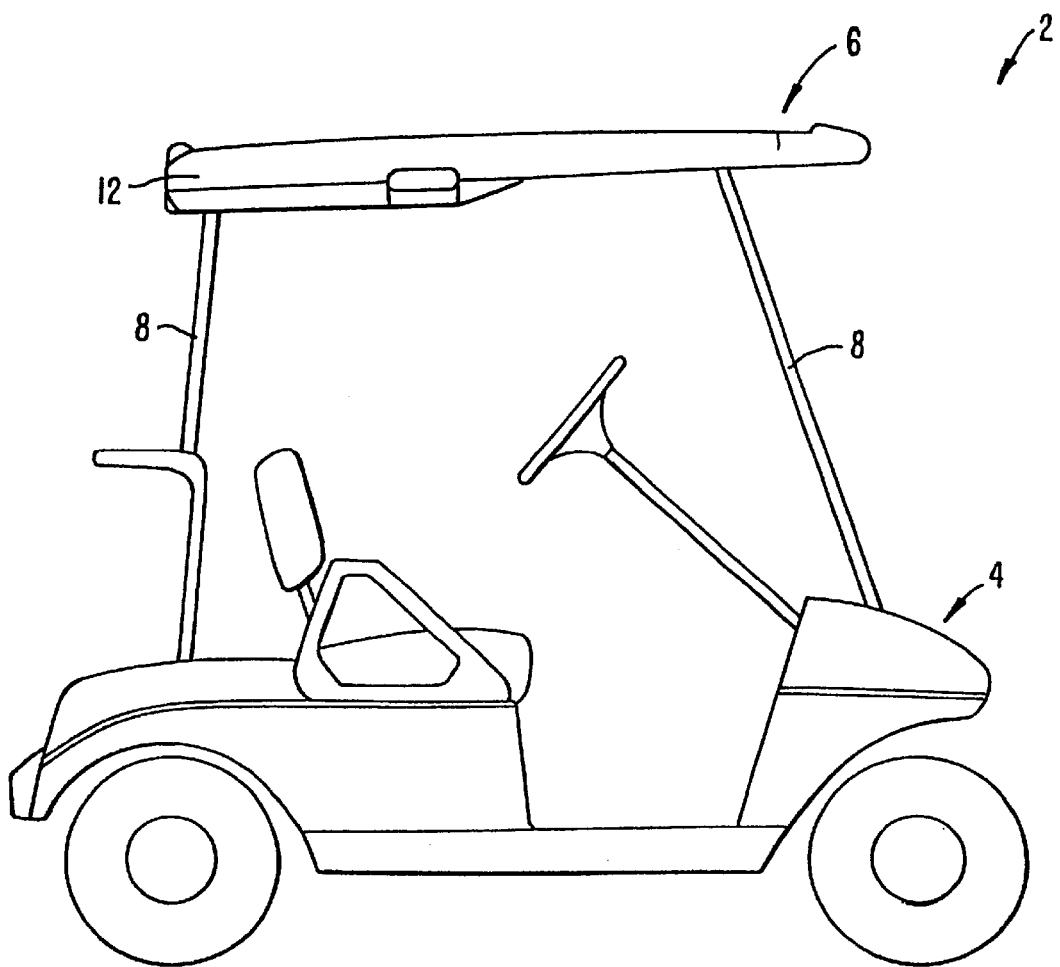
FIG. 1 is a side elevational view of a covered electric car incorporating a PV roof assembly made according to the invention.

FIG. 1 illustrates a covered electric car 2 including an electric car 4 covered by a PV roof assembly 6, the PV roof assembly 6 supported by a roof support framework 8. Electric car 2 may be a conventional electric car such as that made by Club Car, Inc., of Augusta, Ga. While PV roof assembly 6 will typically be used with golf car type of electric cars, can be used with other types of battery powered cars and vehicles which can be designed for use with one, two or more occupants. PV roof assembly 6 could also be used with, for example, hybrid vehicles which use both electricity and a fuel (such as gasoline or natural gas for an internal combustion engine) or with fuel cell-powered vehicles.

FIGS. 2, 2A–2C and 3 illustrate PV roof assembly 6. Assembly 6 includes a PV assembly 10 which is mountable to a roof 12. PV assembly 10 includes a PV panel 14 having a circumferential edge 16 surrounded by a generally C-shaped edge protector 18. Edge protector 18 is preferably made of rubber; it could also be made of other protective materials such as metal or plastic.

It is preferred that PV panel 14 be a monolithic PV panel. This eliminates many of the problems associated with conventional vehicle charging systems. That is, conventional solar charging systems often use several, typically three, conventional solar panels interconnected to one another to create a solar panel array. By using a single, monolithic PV panel, interconnections between individual panels are eliminated creating a system which can be stronger, less expensive and more reliable than multi-panel systems. PV panel 14 includes an array of individual PV cells 20 electrically coupled to one another in a desired pattern to provide the desired voltage and current output.

PV panel 14 is preferably a self-regulating voltage design. That is, PV panel 14 is specially designed to match the voltage characteristics of the electric car 4. This design maximizes electric current charge at low (discharge) battery voltages and self regulates (reduces) its charge at higher battery voltages. The self-regulation feature results from using an appropriate ratio of PV cells to individual battery cells. For crystalline and poly-crystalline photovaltics, the preferred self regulation range is about 4.80 to 5.48 PV cells to battery cells, and more preferably about 5.10 to 5.40 PV cells to battery cells. For hybrid crystalline/thin-film photovoltaics, the preferred self regulation range is about 4.20 to 5.20 PV cells to battery cells, and more preferably about 4.40 to 5.00 PV cells to battery cells. For thin-film photovoltaics the preferred self-regulation range is about 4.10 to 5.50 PV cells to battery cells, and more preferably about 4.20 to 5.40 PV cells to battery cells. Accordingly, the self-regulation is achieved by the appropriate selection of the ratio of PV cells to battery cells which produces an optimal current for a given battery voltage condition.

Figure 2A:
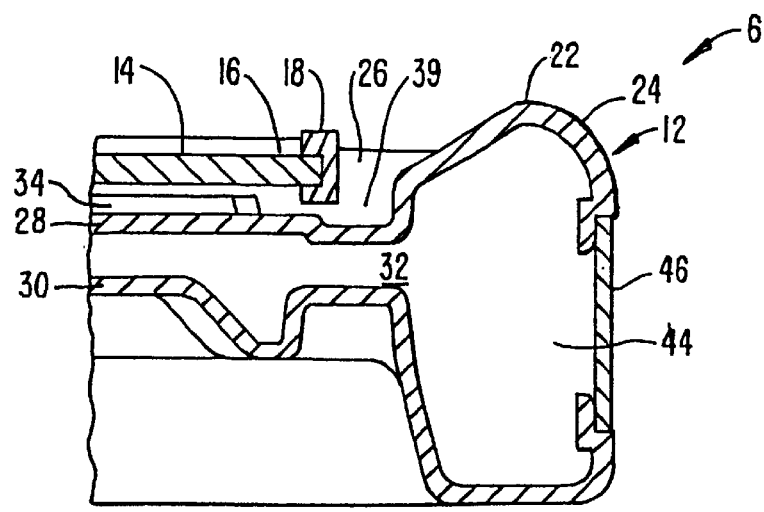
FIG. 2A is an enlarged cross-sectional view taken along line 2A—2A of FIG. 2 illustrating the closable trunk opening which opens into the interior of the roof.
Figure 2B:
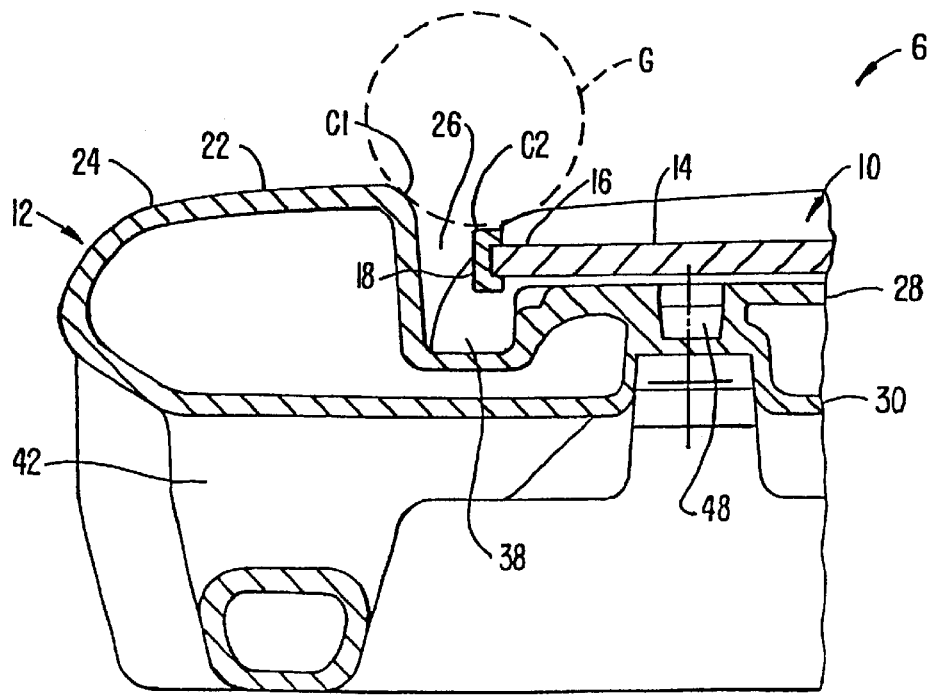
FIG. 2B is a cross-sectional view taken along line 2B—2B of FIG. 2 passing through one of the hand holds in the roof.
Figure 3:
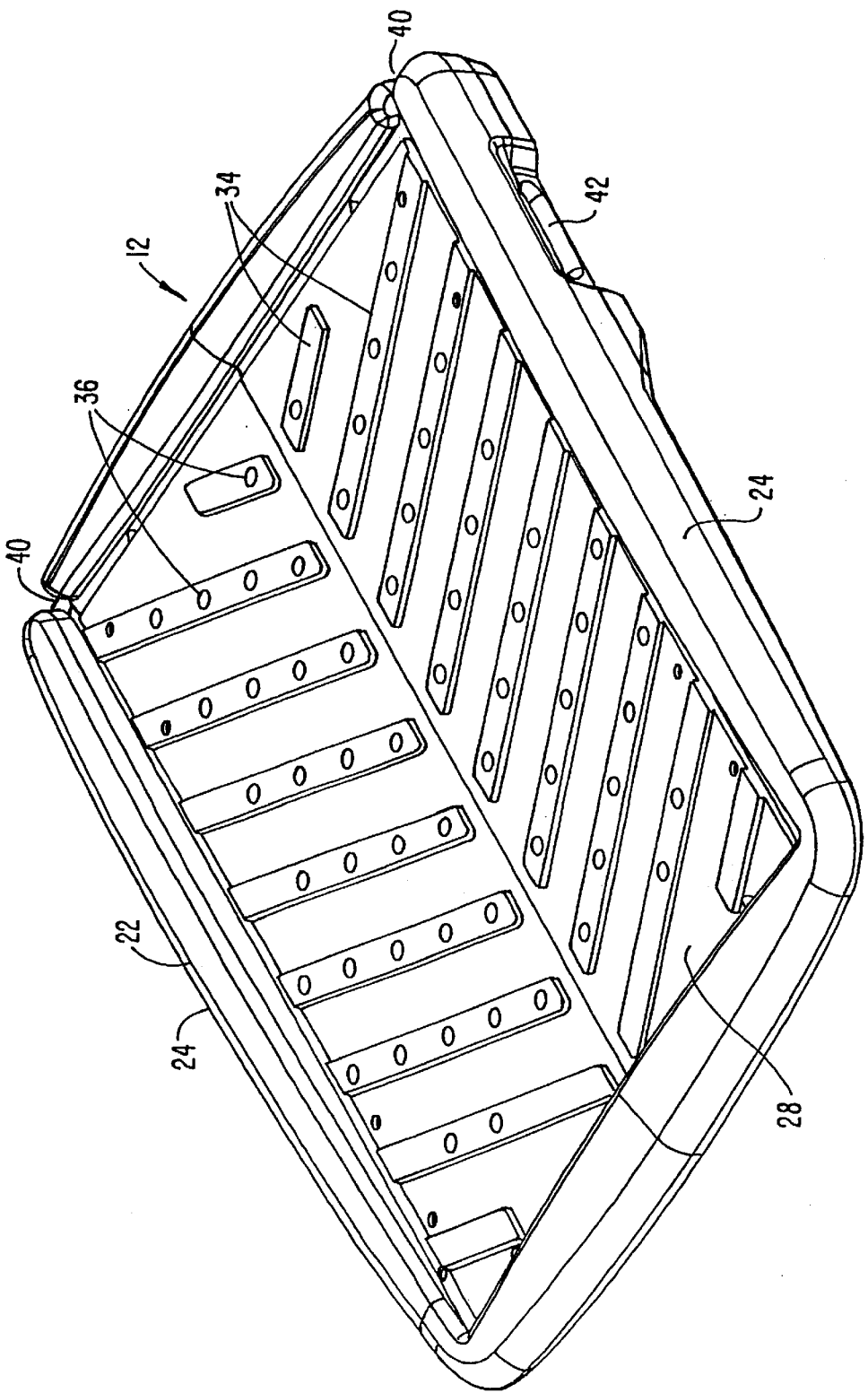
FIG. 3 is a top, front, left side isometric view of the roof of FIG. 2.

As seen in FIGS. 2A and 2B, circumferential edge 16 of PV panel 14 lies below the upper edge 22 of the circumferential lip 24 of roof 12. Therefore, in addition to edge protector 18, the circumferential edge 16 is also protected because its position relative to circumferential lip 24 is such that a golf ball G will not fit into the space 26 between the two. More preferably, the distance between corner C1 of lip 24 and corner C2 of edge 16 is less than the diameter of a conventional golf ball G, that is about 4.3 cm, such that a direct strike of a golf ball G on edge 16 is not possible; this may reduce or eliminate the need for edge protector 18.

Roof 12 includes an upper wall 28 and a lower wall 30 which defines a storage region 32 therebetween. Upper wall 28 has a herringbone pattern of upwardly extending supports 34. Supports 34 include numerous high bond-strength double-stick tape patches 36 used to secure PV assembly to roof 12. Tape patches 36 are preferable made of relatively thick, such as 0.47 mm (0.1875 inch) thick, somewhat spongy material to provide not only secure adhesion but also a certain amount of vibration isolation. Other techniques for securing PV assembly 10 to roof 12, such as using an adhesive, spring clips, shock mounts, threaded fasteners, clamps, etc., could also be used. Laterally-extending kiss-offs (not shown) provide separation between upper and lower walls 28, 30.

In addition to providing a mounting surface for PV panel 14, supports 34 also help to provide cooling air to the underside of PV panel 14. In addition, the herringbone pattern of supports 34 helps to guide water to rain gutters 38, 39, see FIGS. 2A and 2B, formed adjacent to lip 24 along the sides and ends of roof 12. Water empties from roof 12 through one or both gutter drains 40 shown in FIGS. 2 and 2C.

FIG. 2B illustrates a cross-sectional view taken through one of two hand holds 42. FIG. 2A is a cross-sectional view taken through the trunk opening 44 and trunk opening cover 46. Trunk opening 44 provides access to storage region 32 so that various accessories, such as a charge controller, a spray mist pump and reservoir (described below), or other things can be mounted within storage region 32 and yet permit access by, for example, one or more of the owner, the user and a service technician.

Figure 4:
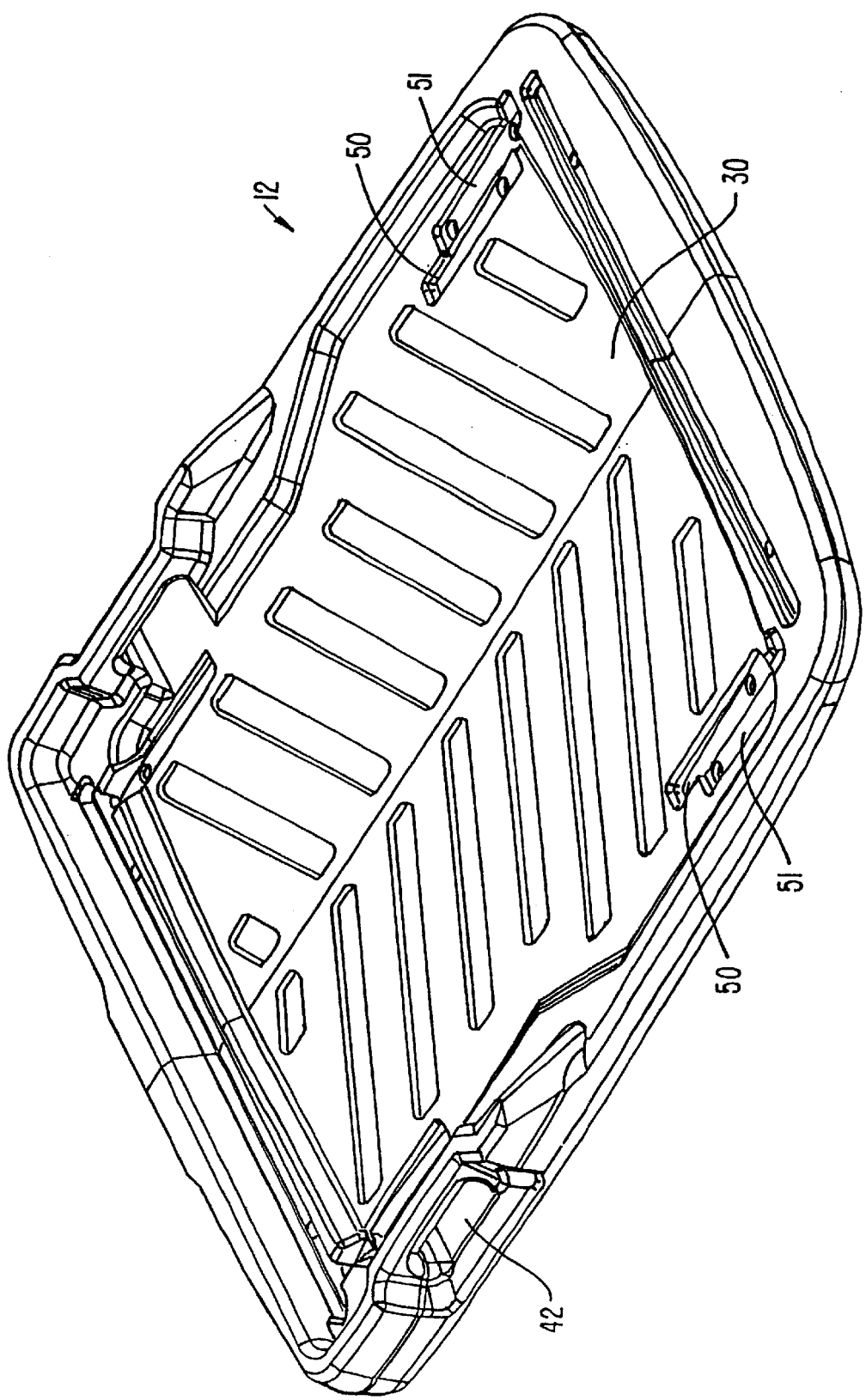
FIG. 4 is a bottom isometric view of the roof of FIG. 3.

FIG. 4 illustrates the underside of roof 12. Roof 12 is designed to be used with more than one brand of electric car 4 and is thus suitable for retrofit applications. To accommodate different types of roof support frameworks 8 for different brands of electric cars 4, different mounting recess, such as those identified as 50, 51, are provided along lower wall 30. FIG. 2B illustrates a cross-sectional view of a typical mounting recess 48 formed in roof 12. Other accommodations, such as brackets, removable or not, may be made to permit assembly 6 to be used with more than one type of electric car 4.

Figure 5:
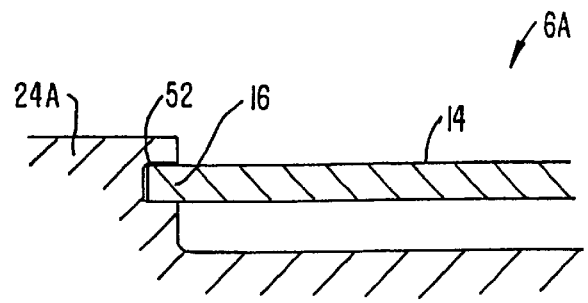
FIG. 5 illustrates an alternative embodiment of the invention in which the circumferential edge of the PV panel is captured within a circumferentially extending recess formed in the edge of the roof to help protect the edge of the PV panel.

The positioning of edge 16 relative to lip 24 and the use of edge protector 18 helps to protect circumferential edge 16 from damage. FIG. 5 illustrates, in simplified form, an alternative method for protecting circumferential edge 16 of PV panel 14 from damage. In the embodiment of FIG. 5, circumferential lip 24A includes a generally u-shaped recess 52 which houses circumferential edge 16 to support and to help prevent damage to the circumferential edge.

Figure 6:
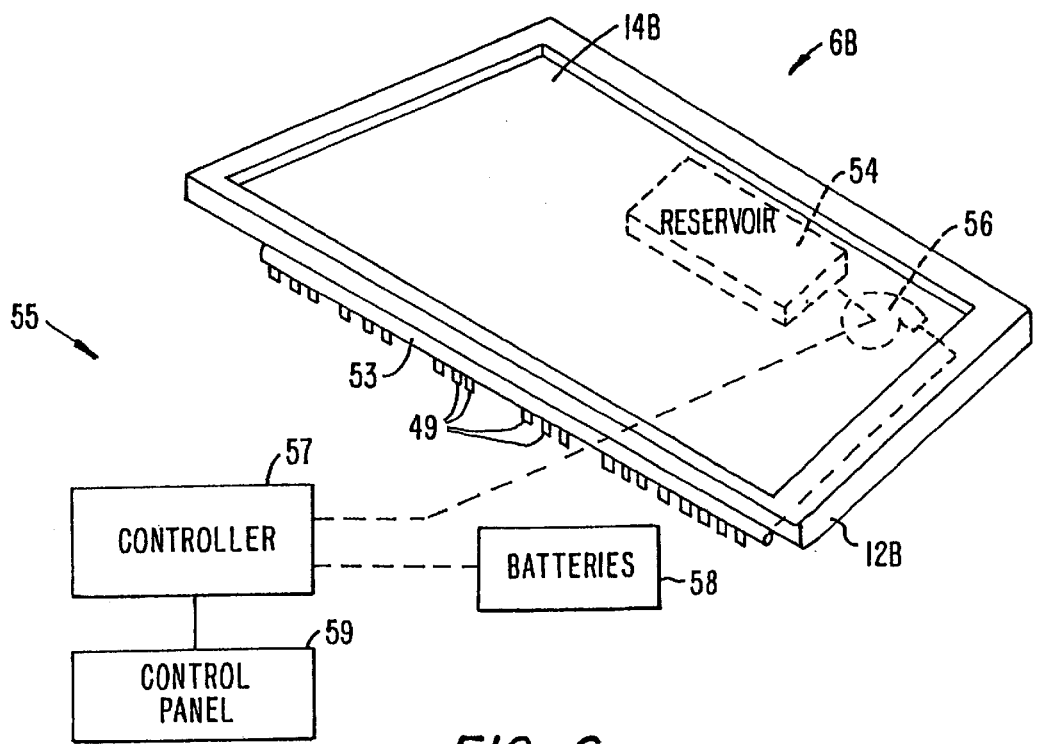
FIG. 6 is a simplified overall view of a PV roof assembly incorporating a misting system coupled to a controller.

FIG. 6 illustrates, in a very simplified form, a PV roof assembly 6B including misting pipes 53 (only one of which is shown) coupled to a water reservoir 54 housed within storage region 32 of roof 12B as parts of a misting system 55. Reservoir 54 could be, for example, made of a flexible bladder or a rigid container, or created by sealing off all or part of region 32. Misting pipes 53 include misting heads or nozzles 49 at appropriate locations along the misting pipes. Misting system 55 also includes a pump 56 coupled to a controller 57. Controller 57 is also coupled to PV panel 14B and batteries 58 to control the charging functions. A control panel 59 is coupled to controller 57 to permit input to the controller and access to various operational parameters, such as battery charge level, charging rate, battery life, etc . . . Control panel 59 preferably includes a graphical display capable of displaying graphical and alphanumeric information to a user, typically to the driver of car 2, so to inform the user of, for example, energy production, pollution avoidance and battery state of charge.

Misting system 55 permits PV roof assembly 6 to provide not only solar charging of batteries 58, but also helps to provide a more pleasant environment for the occupants during hot weather. Misting nozzles 49 may be placed at different locations on the PV roof assembly, the roof support framework and/or the car; for example, misters could be positioned at each corner of the PV roof assembly. Water reservoir 54 could be located on the car rather than the PV roof assembly. The tubes or pipes coupling water reservoir 54 to misting pipes 53, or other misters, could, for example, pass through hollow members of roof support framework 8 and between PV panel and upper wall 12. Misting system 55 could be completely manually controlled, automatically controlled or semi-automatically controlled. Automatic control could be based on one or more of ambient temperature and humidity, solar radiation intensity, whether the car is moving or is stopped, whether the car is occupied, etc. For example, the user could set system 55 to mist continuously only while the seat is occupied and the ambient temperature is above 30° C. (86° F.) Seat occupancy maybe sensed by, for example, a pressure sensor, a proximity sensor or an infrared detector, coupled to controller 57. The seat occupancy sensor may also be used in the control of, for example, radio volume or other passenger-sensitive aspects of car 2. System 55 could also include features to reduce excessive battery discharge, such as automatically shutting the misting system off after a prescribed period; this could also be used to prevent over misting.

Figure 7:
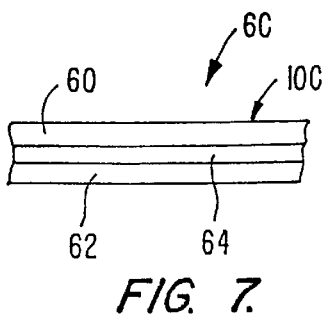
FIG. 7 is a simplified cross-sectional view of a portion of an alternative embodiment of the invention which the PV assembly constitutes the roof.

FIG. 7 illustrates in a simple schematic form, a section of a PV roof assembly 6C which includes no separate roof 12 as in the earlier embodiments. Rather, PV assembly 10C constitutes the roof. In this case, PV assembly 10 includes an upper, protective, at least semi-transparent, and preferable transparent, top layer 60, a bottom layer 62 and a PV layer 64 secured between an in contact with top and bottom layers 60, 62. PV layer 64 may be semi-transparent and bottom layer 62 may be transparent or semi-transparent so that roof assembly 6C can be semi-transparent. By the term semi-transparent it is meant to include layers which allow at least some light to pass through, such as surfaces which are partially transparent and partially opaque, partially translucent and partially opaque, and partially translucent and partially transparent.

Modifications and variations can be made to the disclosed embodiments without departing from the subject of the invention as defined in the following claims.

Any and all patents, patent applications and printed publications referred to above are incorporated by reference.

What is claimed is:

1. An electric vehicle photovoltaic (PV) charging system, the system usable with an electric vehicle, comprising:

a roof, mountable to an electric vehicle, comprising a support surface;

a PV assembly secured to the support surface;

the PV assembly comprising a PV panel having a circumferential edge and the roof comprising:

a circumferential lip extending around and above the PV assembly, whereby the circumferential lip helps to prevent damage to the PV panel;

the circumferential lip and the circumferential edge defining a gap therebetween; and a rain gutter formed below the gap so that water flowing through the gap is collected in the rain gutter.

2. The assembly according to claim 1 further comprising an edge protector covering at least a portion of the circumferential edge.

3. An photovoltaic (PV) roof assembly usable with an electric vehicle having battery cells, comprising:

a roof mountable to an electric vehicle, the roof comprising an upper part;

a PV assembly at the upper part of the roof; and the PV assembly comprising a plurality of PV cells, the ratio of the number of PV cells to the number of battery cells being between about:

4.80 to 5.48 PV cells to battery cells when the PV assembly comprises at least one of crystalline and poly-crystalline photovoltaics;

4.20 to 5.20 PV cells to battery cells when the PV assembly comprises hybrid crystalline/thin-film photovoltaics; and 4.10 to 5.50 PV cells to battery cells when the PV assembly comprises thin-film photovoltaics.

4. The PV roof assembly according to claim 3 wherein said ratios are about:

5.10 to 5.40PV cells to battery cells when the PV assembly comprises at least one of crystalline and poly-crystalline photovoltaics;

4.40 to 5.00 PV cells to battery cells when the PV assembly comprises hybrid crystalline/thin-film photovoltaics; and 4.20 and 5.40 PV cells to battery cells when the PV assembly comprises thin-film photovoltaics.

5. An electric car having battery cells comprising:

an electric vehicle;

a roof mountable to the electric vehicle, the roof comprising an upper part;

a PV assembly at the upper part of the roof, the PV assembly comprising a monolithic PV panel with a plurality of PV cells connected in series;

the roof comprising:

a bottom spaced-apart from the upper part and defining a storage region therebetween;

an access opening opening into the storage region; and a movable cover removably covering the access opening;

the PV panel having a circumferential edge;

the roof comprising a circumferential lip extending around and above the PV assembly, whereby the circumferential lip helps to prevent damage to the PV panel;

a misting system, comprising misting outlets from which mist can be discharged, mounted to the roof; and the PV assembly comprising a plurality of PV cells, the ratio of the number of PV cells to the number of battery cells being between about:

4.80 to 5.48 PV cells to battery cells when the PV assembly comprises at least one of crystalline and poly-crystalline photovoltaics;

4.20 to 5.20 PV cells to battery cells when the PV assembly comprises hybrid crystalline/thin-film photovoltaics; and 4.10 to 5.50 PV cells to battery cells when the PV assembly comprises thin-film photovoltaics.

6. The assembly according to claim 5 wherein the PV panel constitutes at least a major portion of the roof, and wherein the PV panel comprises:

a protective, at least semi-transparent top layer;

a bottom layer; and a PV layer secured between and in contact with the top and bottom layers.

7. The assembly according to claim 5 further comprising an edge protector covering at least a portion of the circumferential edge.

* * * * *